United States Patent
Avent, Jr. et al.

(10) Patent No.: US 12,301,562 B2
(45) Date of Patent: May 13, 2025

(54) THIRD-PARTY AUTHENTICATION PROTOCOLS FOR NATIVE ACCESS CONTROL

(71) Applicant: DISCORD INC., San Francisco, CA (US)

(72) Inventors: John Gilbert Avent, Jr., Gulf Shores, AL (US); Jeffrey Cailteux, San Francisco, CA (US); Janie Jia Gu, San Francisco, CA (US); Zachary Zapasnik, Orlando, FL (US)

(73) Assignee: DISCORD INC., San Francisco, CA (US)

( * ) Notice: Subject to any disclaimer, the term of this patent is extended or adjusted under 35 U.S.C. 154(b) by 227 days.

(21) Appl. No.: 18/061,741

(22) Filed: Dec. 5, 2022

(65) Prior Publication Data

US 2024/0187405 A1    Jun. 6, 2024

(51) Int. Cl.
*H04L 29/06* (2006.01)
*H04L 9/40* (2022.01)

(52) U.S. Cl.
CPC ........ *H04L 63/0853* (2013.01); *H04L 63/102* (2013.01)

(58) Field of Classification Search
CPC .................... H04L 63/0853; H04L 63/102
See application file for complete search history.

(56) References Cited

U.S. PATENT DOCUMENTS

| | | | |
|---|---|---|---|
| 9,338,007 B1 * | 5/2016 | Doshi | H04L 63/0815 |
| 2002/0120582 A1 * | 8/2002 | Elston | G06Q 20/20 |
| | | | 705/64 |
| 2021/0173962 A1 * | 6/2021 | Sarkar | G06F 21/64 |
| 2021/0217106 A1 | 7/2021 | Hauser et al. | |
| 2022/0150277 A1 * | 5/2022 | Maor | H04L 63/1483 |
| 2022/0351202 A1 | 11/2022 | Ghorbani et al. | |

OTHER PUBLICATIONS

International Search Report; dated Mar. 21, 2024; Application # PCT/US2023/082294.

* cited by examiner

*Primary Examiner* — Evans Desrosiers
(74) *Attorney, Agent, or Firm* — Polsinelli PC

(57) ABSTRACT

The present technology provides native access control handling based on curated data received through third-party authentication protocols. Authentication of a user account is based on a set of curated data received from a third-party application with respect to a third-party application user account shared by a same user. The user account is a member of a server that supports near real-time communications through a client application associated with the user account. The set of curated data is received in response to receiving authentication based on a third-party authentication protocol associated with the third-party application. The curated set of data can be displayed in a profile of the user account as well as for providing an access privilege to the user account in the server.

20 Claims, 9 Drawing Sheets

EDIT ROLE - LEVEL-1-TRADER

Display    Permissions    [Passport]    Members - 10

PASSPORT CHECKS                                    Clear connection

Members that pass off of the Passport Verified checks below are automatically added to the role.

[Reddit or Twitter] [+]

🔴 Must have Reddit account                              ✕

Account Age
Account must be at least [365] days old

Karma
Must have at least [7000] Karma

Moderator
Must be a moderator

Gold
Must be a Gold member

——— OR ———

🐦 Must have Twitter account                             ✕

Account Age
Account must be at least [365] days old

Followers
Must have at least [400] followers

Tweets
Must have at least [100] tweets

——— OK ———

Add connection

FIG. 5

THIRD-PARTY AUTHENTICATION PROTOCOLS FOR NATIVE ACCESS CONTROL

BACKGROUND

Some social networks are developed around friendships, professional relationships, or other individual connections, and some social networks create communities around topics. Often social networking platforms provide services through which users can form or interact within a social network. Users can generally post comments or other content, make connections, add links, or simply browse content created by others. Some social networks have moderators that moderate the content in their respective social networks or online communities. While social networks can provide entertainment, networking, commercial, or informational value, they are also subject to various challenges. For social networks that allow users to conduct buying, selling, or trading goods, there needs to be a level of safety and trust that is established to avoid fraudulent transactions. That same level of trust and candidness can also be applied in non-trade-related circumstances across the social networking platforms as well.

BRIEF DESCRIPTION OF THE SEVERAL VIEWS OF THE DRAWINGS

In order to describe the manner in which the above-recited and other advantages and features of the disclosure can be obtained, a more particular description of the principles briefly described above will be rendered by reference to specific embodiments thereof, which are illustrated in the appended drawings. Understanding that these drawings depict only exemplary embodiments of the disclosure and are not, therefore, to be considered to be limiting of its scope, the principles herein are described and explained with additional specificity and detail through the use of the accompanying drawings in which:

FIG. 5 illustrates an example of a GUI presenting a customization control modal for creating custom filtered access to native privileges based on data from third-party applications in accordance with some aspects of the present technology.

DETAILED DESCRIPTION

Figure 1:
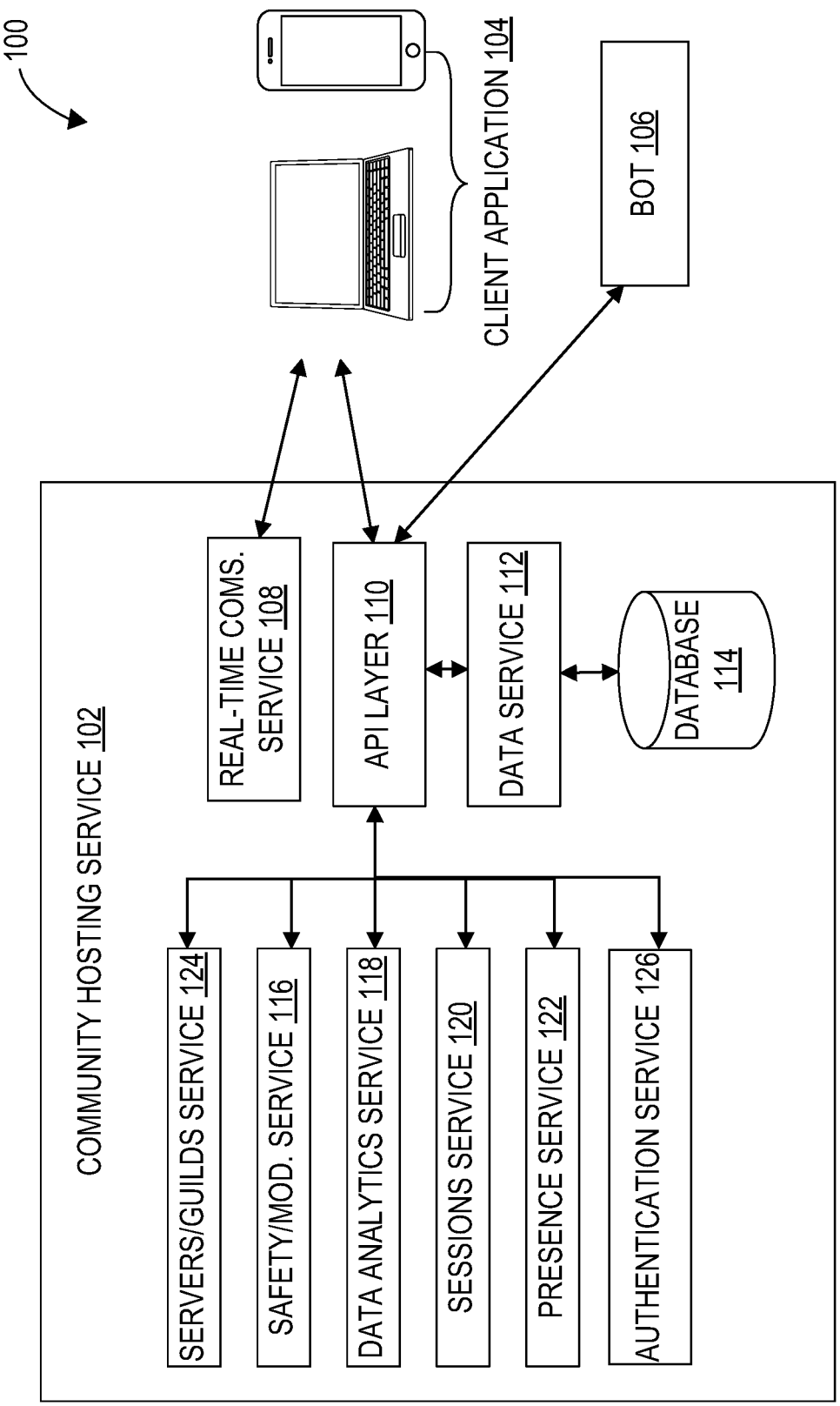
FIG. 1 illustrates an example system that is configured to support user accounts in creating, managing, and participating in online communities in accordance with some aspects of the present technology.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for safety measures for a community hosting service that facilitate real-world transactions, especially with regard to authenticating seller user accounts by giving buyer user accounts access to reliable information about the seller as well as restricting certain capabilities to authenticated sellers. By linking the seller's user account with the seller's other accounts on third-party applications, not only are buyers assured that the seller is who they say they are, but posting on channels can also be restricted to authenticated sellers, reducing instances of fraud and spam.

As described herein, one aspect of the present technology is to receive authentication (i.e., via OAuth 2) from a third-party application to receive a set of curated data that is updated over time, pertaining to a third-party application user account. The third-party application user account is the seller's account at the third-party application. Once authentication is provided, the community hosting service is given permission to receive the set of curated data. For example, the data may pertain to a number of sales that the third-party application user account had over the past year. This information may then be used to either give the user account certain permissions, such as permissions to sell on the channel, and/or may be displayed on a profile of the user account.

By bringing on external data and statistics, such as a rating, a follower or admirer count, a number of posts, a number of sales made, a number of sale posts, or a total of hours played in a game in the third-party application, into the profile, other users can use such information and have more trust in the user account. Users may import the external data to be displayed in their profile as a way to gain respect or to just showcase more about themselves.

In some cases, administrators may be provided the option to customize the set of curated data that is received from the third-party application. The customization gives administrators a more granular way to specify how they want to either present information on a profile or set access privileges. Giving the administrators the option to customize their own settings alleviates any burden on the community hosting service to provide all the various ways the administrator would want to customize their settings.

More specifically, for some community hosting services in which identity of the user behind the user account is not really important for the purposes of communicating in various servers or channels, "authenticating" a user may go beyond just serving transaction-based purposes. The set of curated data from the third-party application may be used in various ways to set the parameters of native access and control. For example, administrators of servers may require that users must have had a certain level of experience in certain games in order to join a channel or send certain messages in the channel. As another example, users may be required or suggested to link to particular third-party applications such that analytics may be performed to better understand the makeup of the users in a particular server (i.e., what percentage of the users are influencers on other applications or what percentage of users have played a certain game) as data for attracting targeted brand deals.

Although the present disclosure broadly covers the use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

FIG. 1 illustrates an example system 100 configured to support user accounts in creating, managing and participating in online communities. In particular, the system 100 supports a plurality of user accounts interacting with each other in communities to which they belong.

The system 100 illustrates an example architecture in which users of user accounts interact through an instance of client application 104 operating on a computing device. The client application 104 can be provided by a webpage rendered in a web browser or a downloaded client application executed by an operating system of the computing device. In some embodiments, some disparate collections of features or functionality might be available in client application 104 depending on the capabilities of the environment executing or rendering the client application 104.

The system 100 also includes a community hosting service 102, which provides an infrastructure for supporting the plurality of user accounts interacting with each other in communities to which they belong. The community hosting service 102 can be a distributed service hosted in a cloud computing architecture. The community hosting service 102 is responsible for hosting various services accessible to the user accounts by the client application 104.

In some embodiments, the community hosting service 102 provides a servers/guilds service 124 to enable user accounts to set up a server (also referred to as a guild) to host members interacting around one or more channels. A server (or guild) is a user-created environment supporting a community. A server is generally configured with one or more channels which are generally created around topics or subtopics, or groups of people, and can support exchanges of communications between user accounts. Some channels are non-real-time channels where users communicate through written messages, images, emojis, recorded voice or video files, attachments, etc. Some channels are real-time communications channels that support voice or video communications. Some channels may be able to support both non-real-time messaging and real-time communications.

A user account can operate their instance of the client application 104 to create a server at the community hosting service 102. In some embodiments, this will be performed by the client application 104 calling the API layer 110 requesting to create a new server. The API layer 110 can then interact with servers/guilds service 124 to create the server by providing the server with a unique identifier and associating various configurations requested by the user account. Once the server is created, the user account that created the server can be considered the owner and/or admin for the server. The servers/guilds service 124 can record the information about the server using data service 112 to store information about the server in database 114.

In some embodiments, servers can be configured to be public or private. A public server is one that any user can search for and request to join. A private server is one that a user needs to be invited to join. Depending on the configuration of the private server, a user can be invited by another user or may need to be invited by the administrator of the private server. Users can request to join a public or private server, and an entity with administrative privileges can grant the request.

In some embodiments, servers can be managed by the user account that created the server. Additionally, server administrators can delegate privileges to other user accounts to be administrators, and administrators can also create or invite bots 106, such as a chatbot, to perform some administrative actions.

In addition to approving user accounts to join a server, administrators can also set up various safety or content moderation policies. In some embodiments, those policies are enforced by user accounts with the administrator role for the server. In some embodiments, the policies can be enforced by software services provided by the community hosting service 102, such as the Safety/moderation service 116 or bot 106.

As introduced above, servers are environments for supporting a community and are generally created around topics. In furtherance of that function, servers can be configured to integrate content through embedded channels or webhooks. For example, an administrator of a server might integrate a YOUTUBE channel, a TWITCH feed, or a TWITTER feed into one or more channels of the server when the content of those channels or feeds are relevant to the channel. In some embodiments, a server can follow a channel offered by another server supported by the community hosting service 102.

In addition to hosts, user accounts that are members of a server can also use their instance of client application 104 to interact with the community hosting service 102. The client application 104 can make requests of the community hosting service 102 to initiate a session with the community hosting service 102 and to access servers and channels to which the user account is a member, receive notifications and send messages, and otherwise communicate in the channels in which they belong.

As illustrated in FIG. 1, community hosting service 102 provides a variety of services that can be called by client application 104 or other services of the community hosting service 102.

For example, the community hosting service 102 includes a servers/guilds service 124. The servers/guilds service 124, as described above, can be used to create and administer a server. Additionally, the servers/guilds service 124 can also support various functions to those user accounts that are members of a server. For example, when an instance of client application 104 establishes a session using sessions service 120, the sessions service 120 can interact with servers/guilds service 124 to provide information regarding the servers to which the user account belongs. The client application 104 can receive identifiers of all servers to which the user account operating the client device associated with client application 104 is a member. While the session is active, client application 104 can request updates regarding one or more of the servers to which the user account operating client application 104 belongs from servers/guilds service 124.

Community hosting service 102 also provides a safety/moderation service 116. As with any online community, community hosting service 102 occasionally needs to deal with user accounts issuing spam or inappropriate content. While administrators of servers can perform some moderation functions such as suspending user accounts on a particular server or banning user accounts or bots for inappropriate posts or for posting spam, community hosting service 102 can have various software services that attempt to moderate some posts. For example, safety/moderation service 116 can include algorithms designed to detect hate speech or other harmful or inappropriate content. Safety/moderation service 116 can also include algorithms configured to identify communications as spam or phishing. Safety/moderation service 116 can provide various functions to protect users from content posted in a channel and attacks on client application 104 or the computing device hosting client application 104.

Community hosting service 102 can also include a data analytics service 118. The data analytics service 118 can provide various services in support of community hosting service 102 and in support of the users of community hosting service 102. For example, data analytics service 118 can monitor the performance of various features of the community hosting service 102 to determine whether updates to features are well received by the user community. The data analytics service 118 can also be used to develop and run various machine learning algorithms and other algorithms designed to identify harmful content, malicious servers, malicious user accounts, and malicious bots 106.

As introduced above, sessions service 120 is configured to authenticate a user account to community hosting service 102. After a user account has been authenticated, the sessions service 120 can determine one or more servers to which the user account is a member or for which the user account is an administrator. The sessions service 120 can send a list of identifiers for the servers associated with the user account to the client application 104. Thereafter, the client application 104 can request information regarding the servers by using a session token that validates that the client application 104 is operating in an authenticated session.

The presence service 122 can be used to provide presence information regarding other members of a server or a channel to which the user account belongs. Through the presence service 122, the client application can convey information about which user accounts are currently active in the server or channel. Likewise, the client application 104 can provide presence information for the user account controlling the instance of client application 104.

Community hosting service 102 can also include a real-time communications service 108. The real-time communications service 108 is configured to support real-time communications such as live voice communications or video conferencing. In some embodiments, the real-time communications service 108 can be a public Internet service located outside a gateway for community hosting service 102. Real-time communications service 108 can provide real-time communications for channels configured to support real-time communications.

Authentication service 126 may assist with receiving authentication (i.e., via OAuth 2) from a third-party application to receive a set of curated data, that is updated over time, pertaining to the third-party application user account. The authentication service 126 serves as a safety measures for the community hosting service 102 when facilitating real-world transactions, especially with regard to authenticating seller user accounts by giving buyer user accounts access to reliable information about the seller as well as restricting certain capabilities to authenticated sellers, as further described below.

FIG. 1 also illustrates a bot 106. The bot 106 can be created and configured by users of the community hosting service 102 and linked to servers chosen by the administrator. In some embodiments, the bot 106 can be configured as a chatbot that can have some understanding of the human language through natural language processing technologies. The bot 106 can be configured to provide some content moderation functions and/or some administrative functions. For example, the bot 106 might be granted permission to invite new members, send messages in a channel, embed links, remove members, delete messages, mute members, and attach files, among other possible functions. In some embodiments, bots 106 can have their own user account and are authenticated using a token. Bots 106 can have full access to all services of community hosting service 102.

While the community hosting service 102 is shown with just one of each service and database, it will be appreciated by those of ordinary skill in the art that community hosting service 102 can include many instances of each service or database, and in some embodiments, there can be different versions of the service or database that may utilize different technologies such as coding languages, database schemes, etc.

In some embodiments, the community hosting service 102 is configured such that the majority of communications between the community hosting service 102 and the client application 104 pass through API layer 110. The client application 104 can request responses from various services provided by the community hosting service 102 from the API layer 110. Additionally, services within the community hosting service 102 can communicate with each other by sending messages through the API layer 110. The client application 104 can also interact with a real-time communications service 108 for voice and video communication services. Although the community hosting service 102 is be described with respect to a particular system architecture and communication flow, it will be appreciated by those of ordinary skill in the art that other system configurations are possible.

Figure 2A:
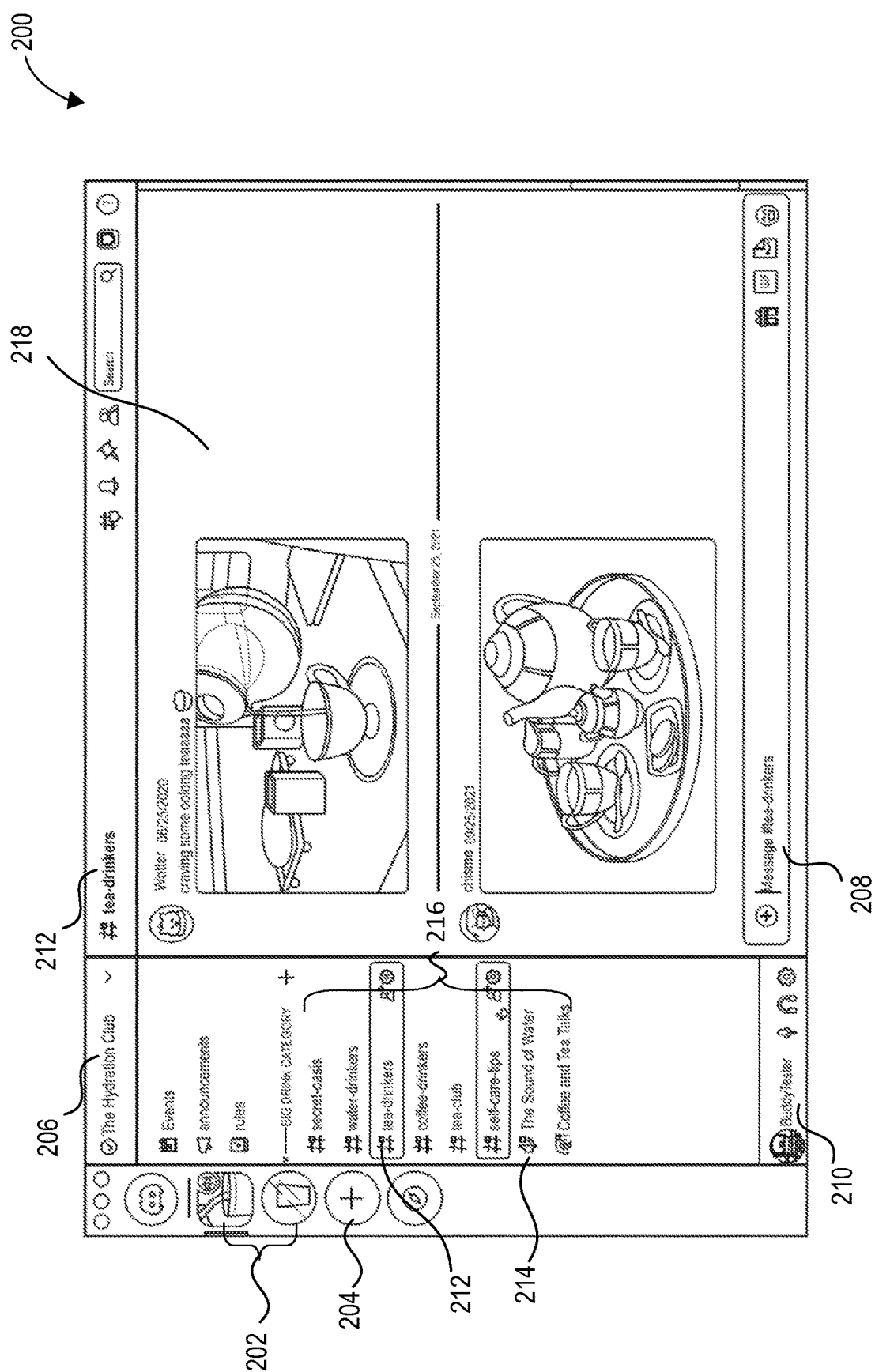
FIG. 2A illustrates an example of a user interface presented by a client application in accordance with some aspects of the present technology.

FIG. 2A illustrates an example of user interface 200 presented by client application 104.

User interface 200 includes icons for servers 202. The top icon has been selected and represents the "hydration club" server. The title 206 of the selected server, the "hydration club," is presented at the top of the user interface 200. User interface 200 also includes a plurality of channels 218 that are part of the server hydration club server. One of the channels, entitled "tea drinkers" 212 is a non-real-time messaging channel. The message thread within the "tea drinkers" channel 214 can be shown within messaging pane 220. As illustrated in FIG. 2A, the messaging pane 218 is configured to present content such as text messages, images, emojis, recorded voice or video files, attachments, etc. A user can provide content to be included in the channel using input interface 208.

User interface 200 also includes a selectable option 204 to add additional servers. User interface 200 also includes a user account icon and controls 210.

Figure 2B:
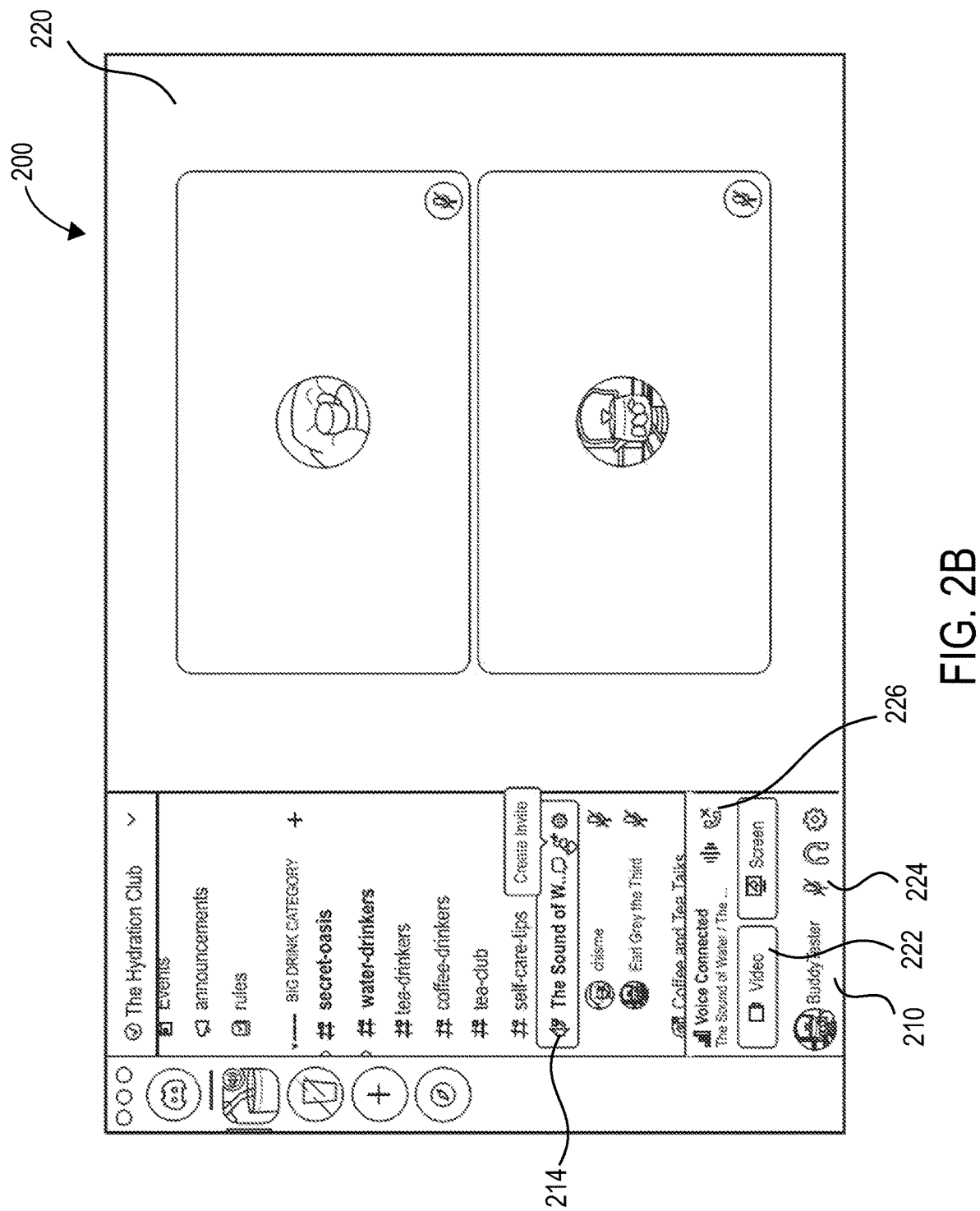
FIG. 2B illustrates an example of a user interface presented by a client application in accordance with some aspects of the present technology.

FIG. 2B illustrates an example of user interface 200 presented by client application 104. In FIG. 2B channel 214 for the channel entitled "sound of water" has been selected. The "sound of water" channel is a real-time communications channel. Accordingly, messaging pane 220 shows two user accounts engaged in real-time communications. As illustrated in FIG. 2B, the user account icon and controls 210 show that the user accounts microphone 224 is muted. Additionally, the user account has options 222 to share their video or screen. The user account can also disconnect from the real-time communications using option 226.

Figure 3:
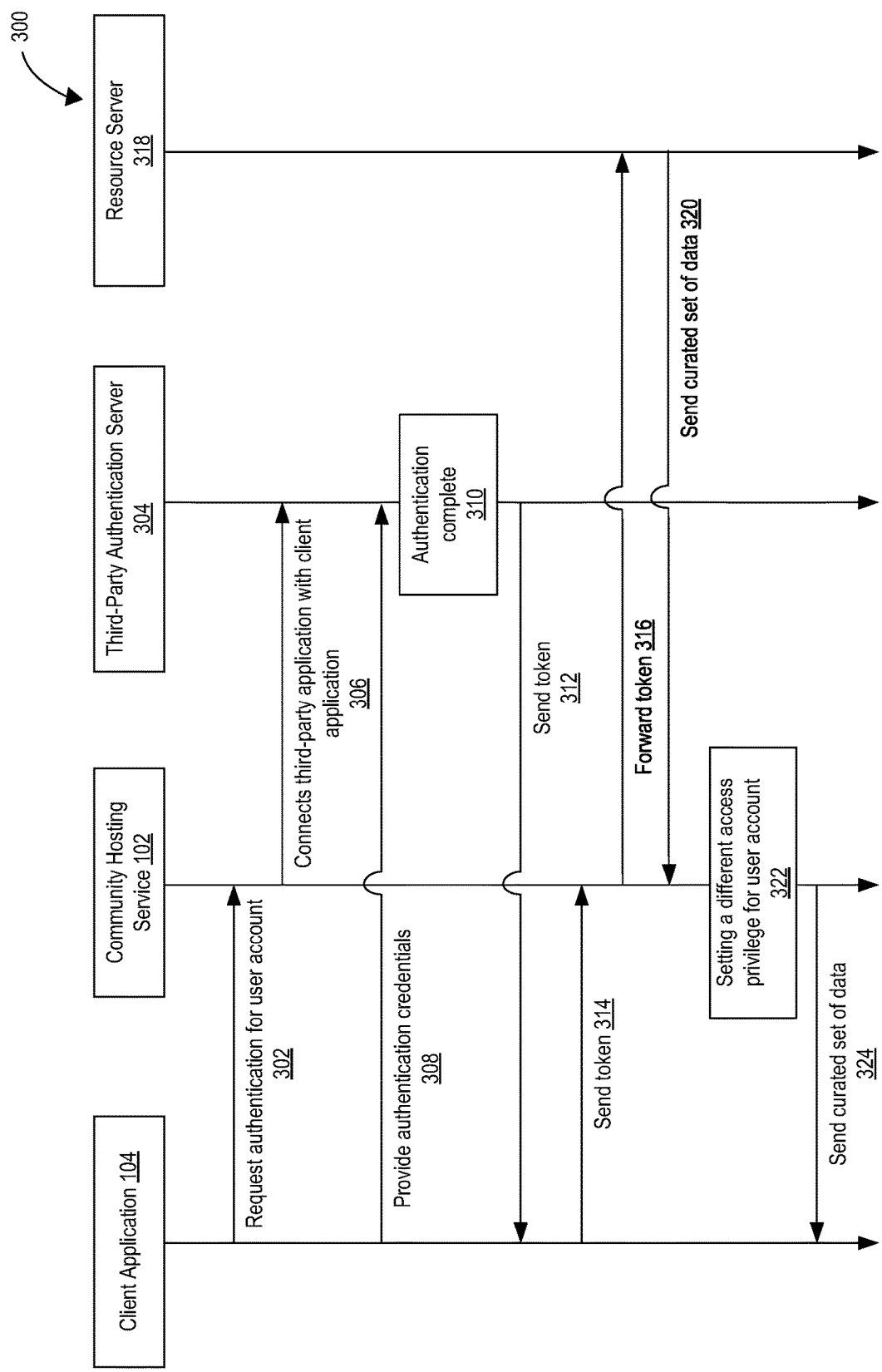
FIG. 3 illustrates an example sequence diagram for native access control handling based on curated data received through third-party authentication protocols in accordance with some aspects of the present technology.

FIG. 3 illustrates an example sequence diagram 300 for native access control handling based on curated data received through third-party authentication protocols, according to some examples of the present disclosure.

The client application 104 may send a request (302) authentication for a user account to the community hosting service 102. The authentication of the user account may link the user account with another user account associated with a third-party application sharing the same user. Communication with the third-party authentication server 304 may be handled by an external application programming interface (API) for executing an authentication protocol with the third-party application, following an OAuth 2.0 workflow. More specifically, the authentication may require a curated set of data from the third-party authentication server 304 that would "authenticate" the user account based on circumstantial and supportive evidence provided by the third-party authentication server 304.

In response to the request, the community hosting service 102 may connect (306) the third-party authentication server 304 with the client application 104. The client application 104 may provide authentication credentials, such as a username and password, PIN, certificate, etc., to the third-party authentication server 304. Once authentication is complete (310), the third-party authentication server 304 may send (312) a token to the client application 104. The client application 104 may, in turn, send (314) the token to the community hosting service 102.

The community hosting service 102 may then forward (316) the token to a resource server 318 associated with the third-party application. The resource server 318 may then send a set of curated data 320 to the community hosting service 102. The community hosting service 102 may further determine whether or not the user account qualifies for a different access privilege. If so, the community hosting service 102 sets (322) the different access privileges for the user account. The community hosting service 102 may further send (324) the set of curated data to the client application 104. In addition, the community hosting service 102 may store the set of curated data in a database along with other sets of curated data. The different access privileges may include one of the following: access to a particular channel, a new role designation that provides new associated access, and access to a voice channel, etc.

Figure 4:
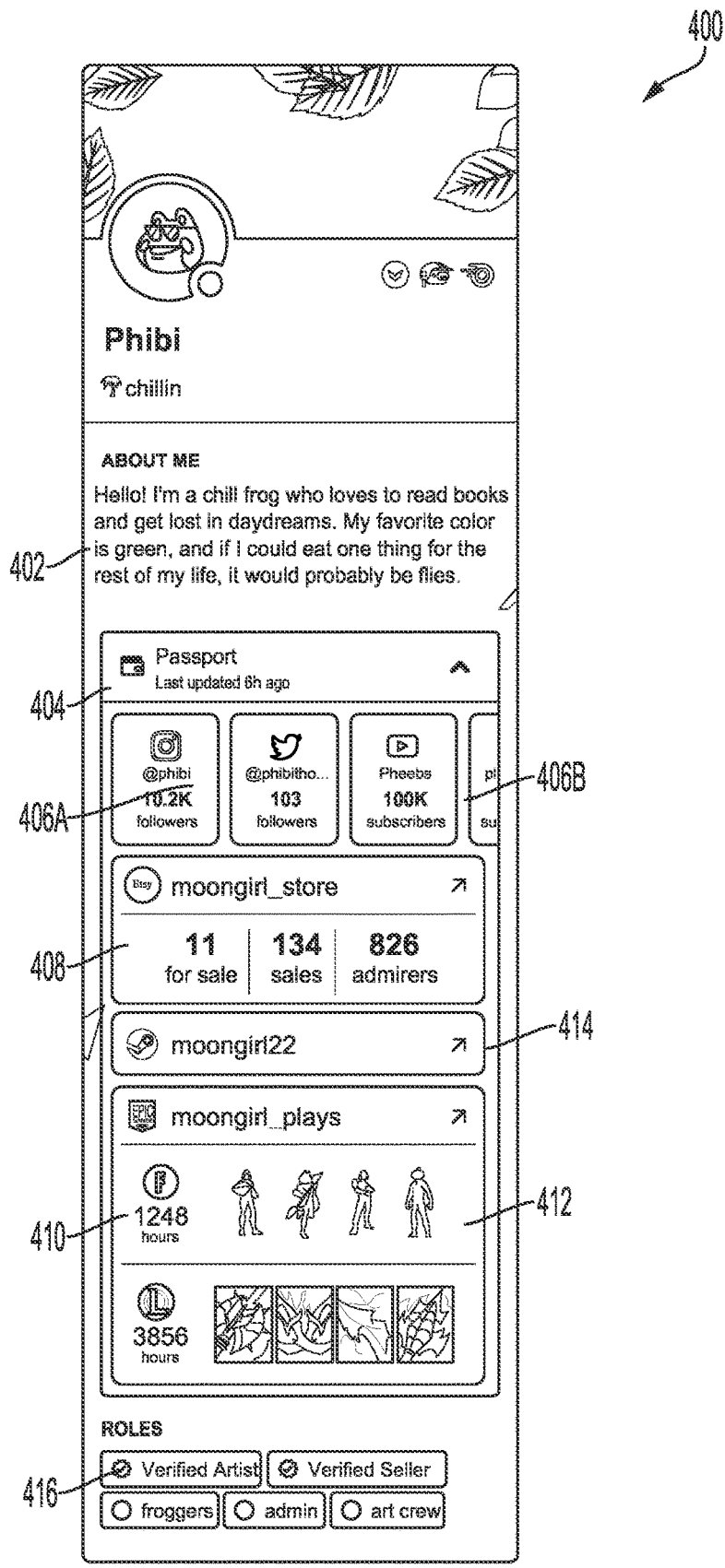
FIG. 4 illustrates an example of a graphical user interface (GUI) presenting a set of curated data in a profile received from third-party applications in accordance with some aspects of the present technology.

FIG. 4 illustrates an example of a GUI 400 presenting sets of curated data in a profile 402 received from third-party applications in accordance with some aspects of the present technology.

The profile 402 is associated with a user account and the profile 402 may include sets of curated data 404 accumulated from one or more third-party applications. The sets of curated data 404 may link to, for example, social media platforms and may indicate a number of followers 406A or media platforms and may indicate a number of subscribers 406B. The sets of curated data 404 may link to third-party marketplaces and may indicate a number of products for sale, number of sales, and/or admirers 408. In addition, the sets of curated data 404 may link to a gaming platform and may indicate a total number of hours played for specific games 410 and/or characters/skins they own 412.

By bringing on external data and statistics, such as a rating, a follower or admirer count, a number of posts, a number of sales made, a number of sale posts, or a total of hours played in a game in the third-party application, into the profile, other users can use such information and have more trust in the user account. Users may import the external data to be displayed in their profile as a way to gain respect or to just showcase more about themselves.

For each set of curated data associated with a respective third-party application, there may be a link 414 to a respective profile at the respective third-party application. Furthermore, once the community hosting service 102 has received the sets of curated data, the user account has the option to display or not display the sets of curated data on their profile. The user account may choose just to display their third-party username and the link 414.

The profile 402 may further include what roles the user account has, wherein certain roles that have been authenticated based on the sets of curated data are designated differently (e.g., with a check mark) indicating that they have been authenticated for that role, which may further provide different access privileges in certain servers and/or channels.

FIG. 5 illustrates an example of a GUI 500 presenting a customization control modal 502 for creating custom filtered access to native privileges based on data from third-party applications in accordance with some aspects of the present technology. In some cases, administrators may be provided the option to customize the set of curated data that is received from the third-party application. The customization gives administrators a more granular way to specify how they want to either present information on a profile or set access privileges. Giving the administrators the option to customize their own settings alleviates any burden on the community hosting service to provide all the various ways the administrator would want to customize their settings.

To provide administrators with a wider range of options and without placing a burden on the community hosting service 102, the customization control modal 502 may be presented to administrators to create custom filtered access to native privileges based on data from third-party applications. The administrator may be provided an option 504 to choose which third-party application the set of curated data is being received from. In some cases, the administrator may choose and/or scenarios between two third-party applications, whereby the third-party user accounts need to pass both set requirements or either of the requirements. The administrator may further add more third-party applications 507 to add more requirements.

With respect to the requirements, they may include, for example, that an account age 508A of the third-party user account must be at least a certain number of days old. For customization, the administrator may enter in a field 506 that is associated with numerical quantifications. Additional examples may include that the requirement may be that the third-party user account has a certain role 508B, have a certain number of followers 508C, and/or have posted a certain amount 508D. In addition, the administrator may be provided an option to toggle 510 each individual requirement on or off as they see fit.

Specific requirements may be set out by the community hosting service 102 or added by the administrator or a developer. For cases in which the developer wants to set up a custom set of requirements, the developer may attach a bot 106 that may provide an application programming interface (API) that pulls a custom set of curated data, and the elevated permissions status may be provided based on the pulled custom set of curated data. In such a case, the permissions status may just be to be able to show the set of curated data in the profile.

Figure 6:
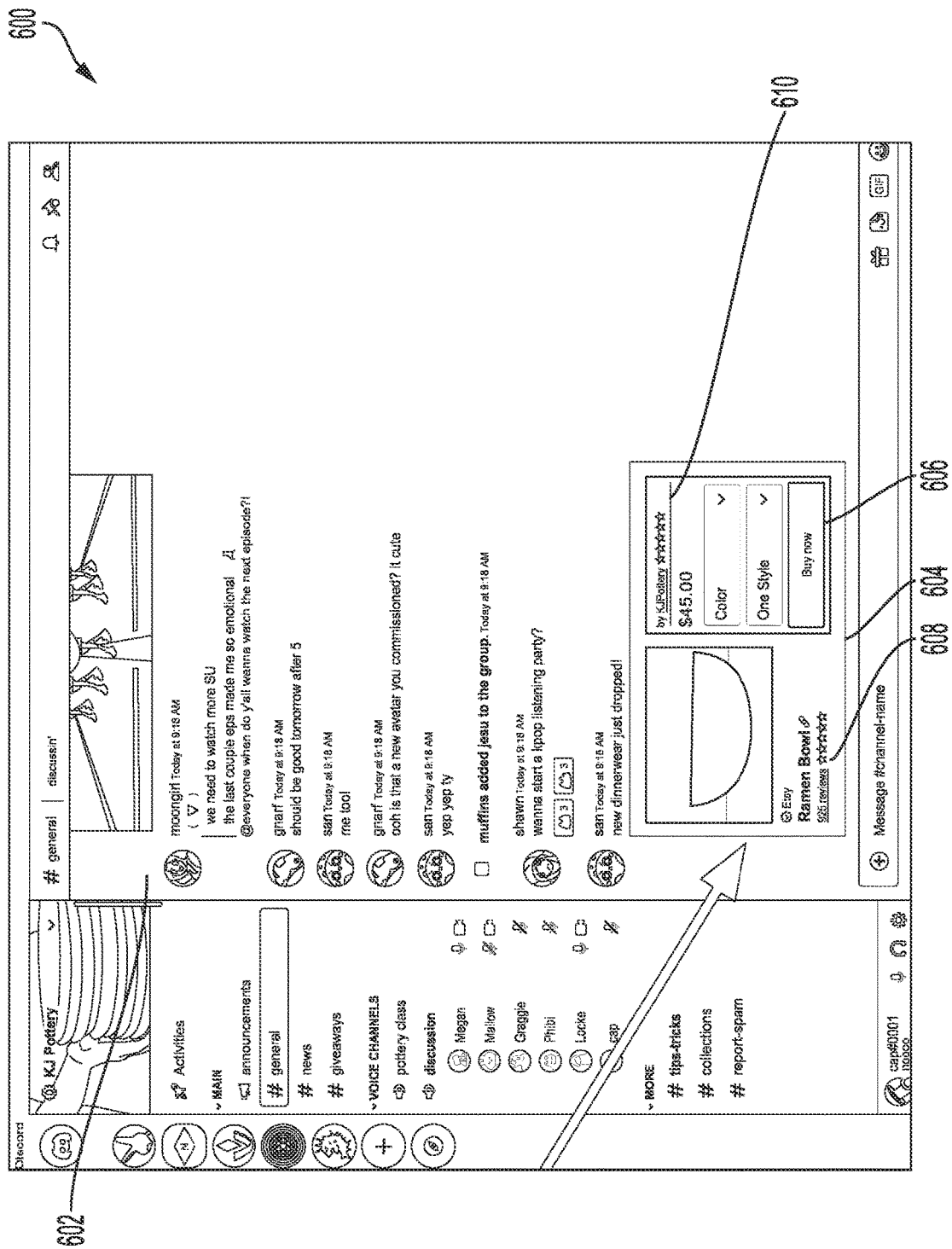
FIG. 6 illustrates an example of a GUI 600 presenting a sale post based on a set of curated data originating from a third-party application, the sale post posted directly in a channel in which users can directly purchase, in accordance with some aspects of the present technology.

FIG. 6 illustrates an example of a GUI 600 presenting a sale post based on a set of curated data originating from a third-party application, the sale post posted directly in a channel in which users can directly purchase, in accordance with some aspects of the present technology.

The channel 602 may be a general channel as shown in FIG. 6 or may be in a restricted channel that only allows users that have a specific access privilege to post or even view. By commenting in the channel, the seller can notify potential buyers of a new sale to be aware of. In addition, the seller may set up a storefront that includes all of their products so that users can browse all the different listings. From the storefront interface, the seller may choose the sale post 604 to be posted in the channel. Furthermore, the generated online sale may route through the third-party application or be its own separate online sale through the community hosting service 102. In addition, the listing may be created natively and may also cross-post listing from third-party sites, such as GOAT, OpenSea, etc.

The sale post 604 may include a "buy now" button 606, or an "add to cart" button. The sale post 604 may be generated from a set of curated data from the respective third-party application, such as a third-party marketplace. The sale post 604 may include the name of the third-party marketplace, a rating and/or a link to reviews 608 at the respective store at the third-party marketplace. The sale post 604 may further include a rating 610 of the user account at the community hosting service 102.

Figure 7:
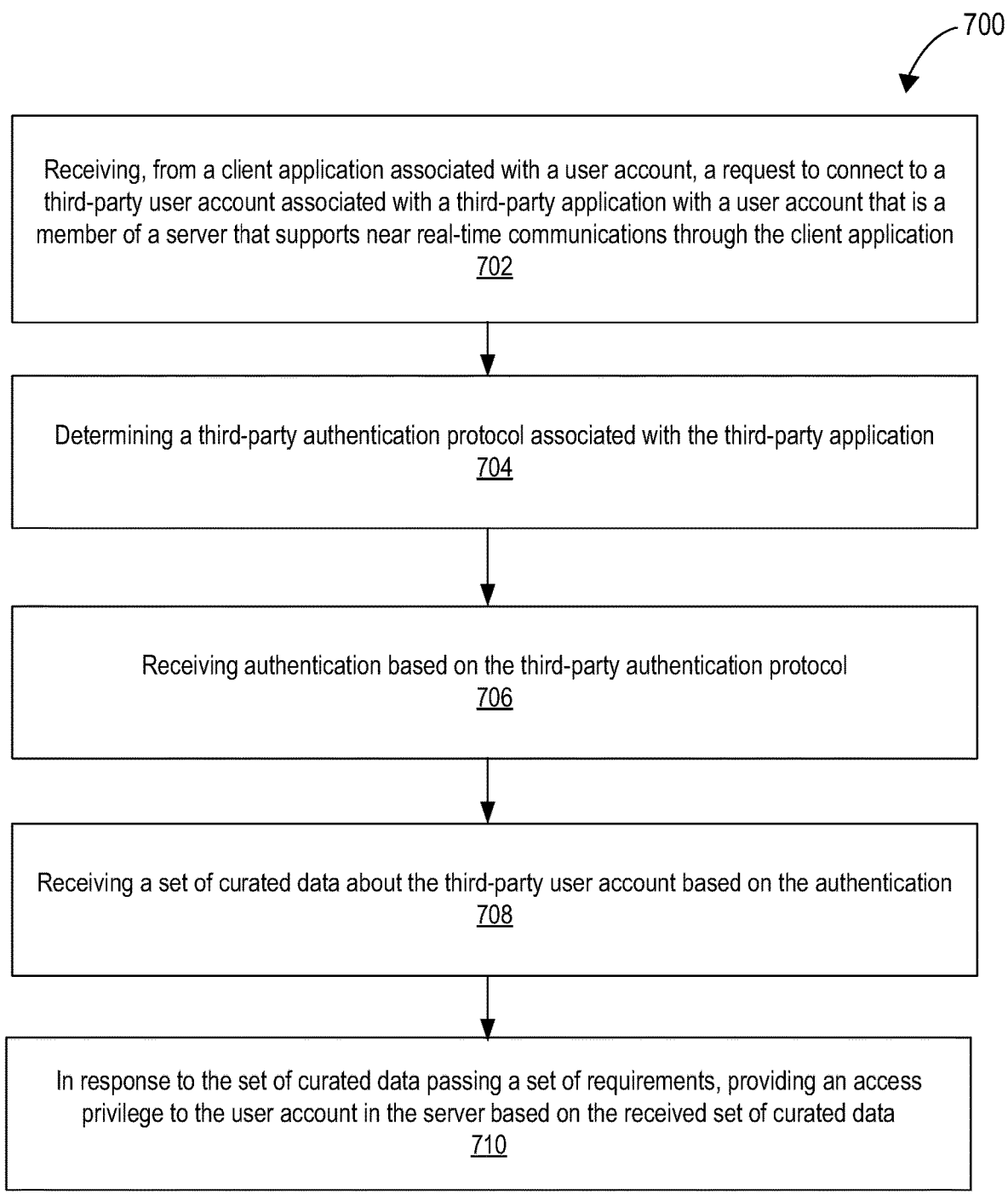
FIG. 7 illustrates an example flowchart diagram for native access control handling based on curated data received through third-party authentication protocols in accordance with some aspects of the present technology.

FIG. 7 illustrates an example flowchart diagram for native access control handling based on curated data received through third-party authentication protocols in accordance with some aspects of the present technology. Although the example method 700 depicts a particular sequence of operations, the sequence may be altered without departing from the scope of the present disclosure. For example, some of the operations depicted may be performed in parallel or in a different sequence that does not materially affect the function of the method 700. In other examples, different components of an example device or system that implements the method 700 may perform functions at substantially the same time or in a specific sequence.

According to some examples, the method 700 includes receiving, from a client application associated with a user account, a request to connect to a third-party user account associated with a third-party application with a user account that is a member of a server that supports near real-time communications through the client application at block 702. For example, the authentication service 126, illustrated in FIG. 1, may receive the request to connect to the third-party user account. The request may be for obtaining specifically the access privilege. The access privilege may allow the user account to perform one or more actions in the server. Furthermore, the access privilege may provide access to a channel that requires all members to have the access privilege. In addition, the access privilege may be a removal of rights. For example, access may be filtered based off the set of curated data.

According to some examples, the method 700 includes determining a third-party authentication protocol associated with the third-party application at block 704. For example, the authentication service 126, illustrated in FIG. 1, may determine a third-party authentication protocol associated with the third-party application. For example, the third-party authentication protocol may be an OAuth 2 workflow. According to some examples, the method 700 includes receiving authorization to access a third-party user account using the third-party authentication protocol, at block 706. For example, the authentication service 126, illustrated in FIG. 1, may receive authorization to access the third-party user account. Furthermore, receiving authentication based on the third-party authentication protocol may include validating data from a public blockchain with connected wallets and signed messages.

According to some examples, the method 700 includes receiving a set of curated data about the third-party user account based on the authentication, at block 708. For example, the authentication service 126 and/or the community hosting service 102, an example of which is illustrated in FIG. 1, may receive the set of curated data about the third-party user account. According to some examples, the method 700 includes in response to the set of curated data passing a set of requirements, providing an access privilege to the user account in the server based on the received set of curated data at block 710. For example, the authentication service 126 and/or the community hosting service 102, an example of which is illustrated in FIG. 1, may provide the access privilege.

For example, an administrator may require that in order for a member of a server to obtain a particular seller verified role, the member must have an authorized third-party user account that has sold over 10 items on a third-party marketplace. Once the set of curate data indicates that the authorized third-party user account that has sold over 10 items on a third-party marketplace, the user account is granted the access privilege associated with the seller verified role. In some cases, the access privilege may further include access to particular channels, the ability to do voice chat, or just an privilege that the community hosting service 102 provides.

In some cases, the method includes causing to display the set of curated data in a profile of the user account, wherein the profile includes an engageable link to the third-party application. The profile may include multiple sets of curated data associated with different third-party applications. The profile may further include any kind of defining quality associated with the third-party user account such as a rating, a follower or admirer count, a number of posts, a number of sales made, a number of sale posts, or a total of hours played in a game in the third-party application. Furthermore, analytics pertaining to how many user accounts in the server have the access privilege may be provided to the administrator and/or third parties, such as for brand deals. For example, brands would be interested in advertising in a channel that has been verified to include over a certain percentage of user that fall in their demographic.

In some cases, a sale post associated with a third-party sale post at the third-party application may be generated and inserted as a comment in a channel associated with the server. Furthermore, the sale post may be generated from the set of curated data. The sale transaction associated with the sale post may be performed at the community hosting service 102, which saves time for the purchaser by removing the need to open the third-party application.

In some cases, the method includes receiving a customized setting for a second access privilege that requires passing a custom set of requirements by a custom set of curated data from the third-party application. The method may further include receiving the custom set of curated data from the third-party application and in response to passing the custom set of requirements, causing to display the custom set of curated data in the profile of the user account. The customized setting may be set by an administrator of a server that changes from a default setting. In order to do so, a customization modal may be displayed in a client application associated with an administrator account whereby the customization modal provides a means for customizing what data to be extracted resulting in the custom set of curated data. The customization includes a field to include a numerical quantity associated with one of the requirements.

Furthermore, for the third-party application that does not have a set third-party authentication protocol, for example, a bot 106 may be attached to the server and the bot may enable customization for receiving a custom set of curated data. The bot may provide an application programming interface (API) that receives the custom set of curated data pushed from the third-party application. On the other hand, in some cases, non-customized sets of curated data are pulled from the respective third-party applications.

For example, for a third-party application that does not have an authentication protocol set with the community hosting service 102, a bot 106 may be used to enable customization for receiving a custom set of curated data for a particular server. Third-party applications that are not as widely used and may have data that only specific to that particular server, may be accessed via the bot 106. The third-party application may be a social media platform that only serves a particular country, for example.

Figure 8:
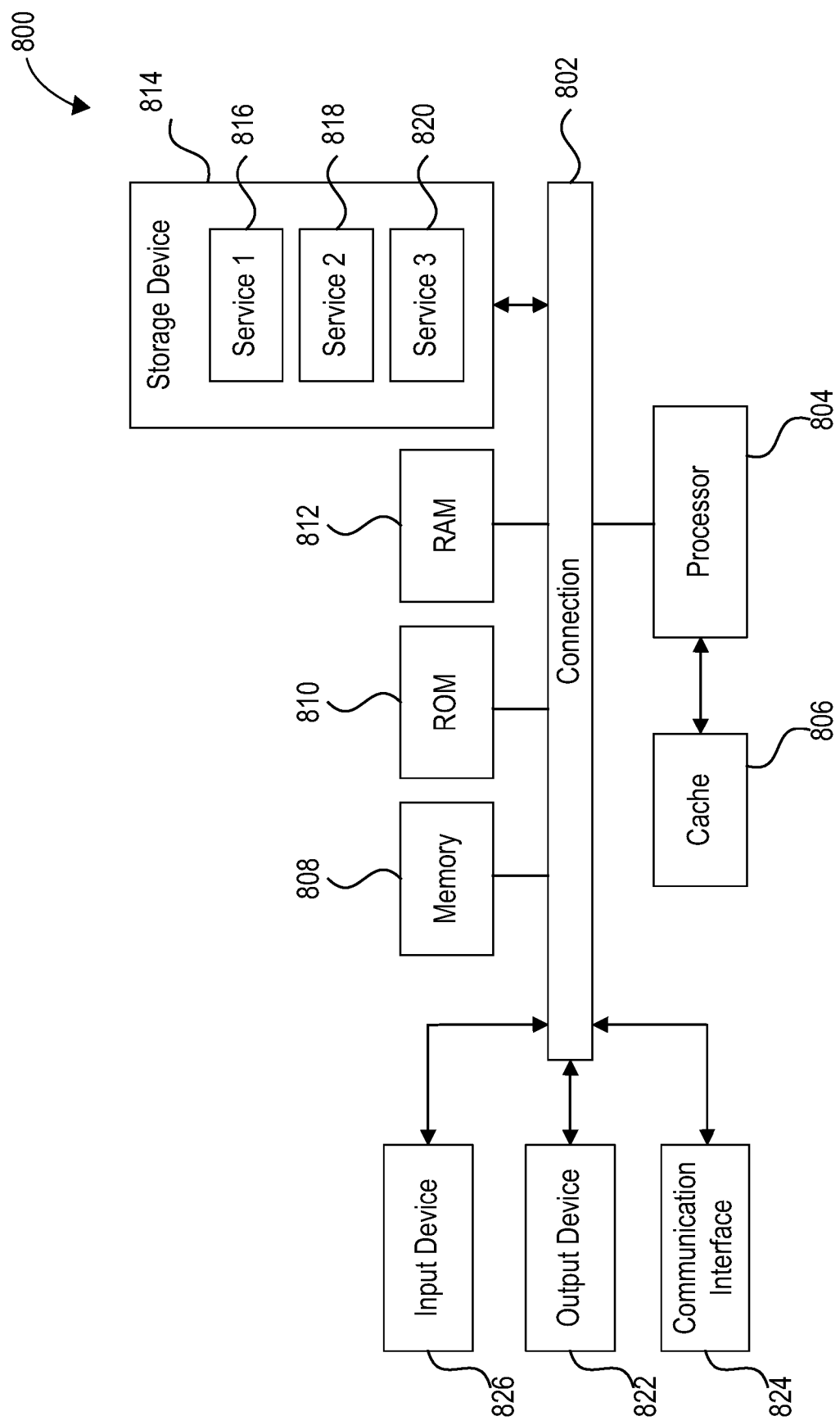
FIG. 8 shows an example of a system for implementing certain aspects of the present technology.

FIG. 8 shows an example of computing system 800, which can be for example any computing device making up client application 104, community hosting service 102, or any component thereof in which the components of the system are in communication with each other using connection 802. Connection 802 can be a physical connection via a bus, or a direct connection into processor 804, such as in a chipset architecture. Connection 802 can also be a virtual connection, networked connection, or logical connection.

In some embodiments, computing system 800 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 800 includes at least one processing unit (CPU or processor) 804 and connection 802 that couples various system components including system memory 808, such as read-only memory (ROM) 810 and random access memory (RAM) 812 to processor 804. Computing system 800 can include a cache of high-speed memory 806 connected directly with, in close proximity to, or integrated as part of processor 804.

Processor 804 can include any general purpose processor and a hardware service or software service, such as services 816, 818, and 820 stored in storage device 814, configured to control processor 804 as well as a special-purpose processor where software instructions are incorporated into the actual processor design. Processor 804 may essentially be a completely self-contained computing system, containing multiple cores or processors, a bus, memory controller, cache, etc. A multi-core processor may be symmetric or asymmetric.

To enable user interaction, computing system 800 includes an input device 826, which can represent any number of input mechanisms, such as a microphone for speech, a touch-sensitive screen for gesture or graphical input, keyboard, mouse, motion input, speech, etc. Computing system 800 can also include output device 822, which can be one or more of a number of output mechanisms known to those of skill in the art. In some instances, multimodal systems can enable a user to provide multiple types of input/output to communicate with computing system 800. Computing system 800 can include communication interface 824, which can generally govern and manage the user input and system output. There is no restriction on operating on any particular hardware arrangement, and therefore the basic features here may easily be substituted for improved hardware or firmware arrangements as they are developed.

Storage device 814 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 814 can include software services, servers, services, etc., that when the code that defines such software is executed by the processor 804, it causes the system to perform a function. In some embodiments, a hardware service that performs a particular function can include the software component stored in a computer-readable medium in connection with the necessary hardware components, such as processor 804, connection 802, output device 822, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Illustrative examples of the disclosure include:

Aspect 1. A computer-implemented method, comprising: receiving, from a client application associated with a user account, a request to connect to a third-party user account associated with a third-party application with the user account that is a member of a server that supports near real-time communications through the client application; determining a third-party authentication protocol associated with the third-party application; receiving authorization to access a third-party user account using the third-party authentication protocol; receiving a set of curated data about the third-party user account from the third-party authentication protocol; and in response to the set of curated data passing a set of requirements, providing an access privilege to the user account in the server based on the received set of curated data.

Aspect 2. The computer-implemented method of Aspect 1, further comprising: causing to display the set of curated data in a profile of the user account, wherein the profile includes an engagable link to the third-party application.

Aspect 3. The computer-implemented method of any of Aspects 1 to 2, further comprising: presenting a rating, a follower or admirer count, a number of posts, a number of sales made, a number of sale posts, or a total of hours played in a game in the third-party application in the profile.

Aspect 4. The computer-implemented method of any of Aspects 1 to 3, further comprising: receiving a customized setting for a second access privilege that requires passing a custom set of requirements by a custom set of curated data from the third-party application; receiving the custom set of curated data from the third-party application; and in response to passing the custom set of requirements, causing to display the custom set of curated data in the profile of the user account.

Aspect 5. The computer-implemented method of any of Aspects 1 to 4, further comprising: causing to display a customization modal that provides a means for customizing what data to be extracted resulting in the custom set of curated data, wherein the customization includes a field to include a numerical quantity associated with one of the requirements.

Aspect 6. The computer-implemented method of any of Aspects 1 to 5, further comprising: attaching a bot to the server, wherein the bot provides an application programming interface (API) that receives the custom set of curated data pushed from the third-party application.

Aspect 7. The computer-implemented method of any of Aspects 1 to 6, wherein the request is for obtaining the access privilege, and wherein the access privilege allows the user account to perform one or more actions in the server.

Aspect 8. The computer-implemented method of any of Aspects 1 to 7, wherein the access privilege provides access to a channel that requires all members to have the access privilege.

Aspect 9. The computer-implemented method of any of Aspects 1 to 8, further comprising: providing analytics pertaining to how many user accounts in the server have the access privilege.

Aspect 10. The computer-implemented method of any of Aspects 1 to 9, further comprising: generating a sale post associated with a third-party sale post at the third-party application; and inserting the sale post as a comment in a channel associated with the server.

Aspect 11. The computer-implemented method of any of Aspects 1 to 10, wherein the sale post is generated from the set of curated data.

Aspect 12. The computer-implemented method of any of Aspects 1 to 11, wherein the receiving authentication based on the third-party authentication protocol includes validating data from a public blockchain with connected wallets and signed messages.

Aspect 13. A non-transitory computer-readable medium comprising instructions, the instructions, when executed by a computing system, causes the computing system to: receive, from a client application associated with a user account, a request to connect to a third-party user account associated with a third-party application with the user account that is a member of a server that supports near real-time communications through the client application; determine a third-party authentication protocol associated with the third-party application; receive authorization to access a third-party user account using the third-party authentication protocol; receive a set of curated data about the third-party user account based on the authentication; and in response to the set of curated data passing a set of requirements, provide an access privilege to the user account in the server based on the received set of curated data.

Aspect 14. The non-transitory computer-readable medium of Aspect 13, wherein the instructions, when executed by the computing system, causes the computing system to: cause to display the set of curated data in a profile of the user account, wherein the profile includes an engagable link to the third-party application.

Aspect 15. The non-transitory computer-readable medium of any of Aspects 13 to 14, wherein the instructions, when executed by the computing system, causes the computing system to: present a rating, a follower or admirer count, a number of posts, a number of sales made, a number of sale posts, or a total of hours played in a game in the third-party application in the profile.

Aspect 16. The non-transitory computer-readable medium of any of Aspects 13 to 15, wherein the instructions, when executed by the computing system, causes the computing system to: receive a customized setting for a second access privilege that requires passing a custom set of requirements by a custom set of curated data from the third-party application; receive the custom set of curated data from the third-party application; and in response to passing the custom set of requirements, cause to display the custom set of curated data in the profile of the user account.

Aspect 17. The non-transitory computer-readable medium of any of Aspects 13 to 16, wherein the instructions, when executed by the computing system, causes the computing system to: causing to display a customization modal that provides a means for customizing what data to be extracted resulting in the custom set of curated data, wherein the customization includes a field to include a numerical quantity associated with one of the requirements.

Aspect 18. The non-transitory computer-readable medium of any of Aspects 13 to 17, wherein the instructions, when executed by the computing system, causes the computing system to: attaching a bot to the server, wherein the bot provides an application programming interface (API) that receives the custom set of curated data pushed from the third-party application.

Aspect 19. A system comprising: one or more processors; and a non-transitory computer-readable medium comprising instructions, the instructions, when executed by the one or more processors, causes the one or more processors to: receive, from a client application associated with a user account, a request to connect to a third-party user account associated with a third-party application with the user account that is a member of a server that supports near real-time communications through the client application; determine a third-party authentication protocol associated with the third-party application; receive authorization to access a third-party user account using the third-party authentication protocol; receive a set of curated data about the third-party user account based on the authentication; and in response to the set of curated data passing a set of requirements, provide an access privilege to the user account in the server based on the received set of curated data.

Aspect 20. The system of Aspect 19, wherein the instructions, when executed by the one or more processors, causes the one or more processors to: causing to display the set of curated data in a profile of the user account, wherein the profile includes an engagable link to the third-party application.

What is claimed is:

1. A computer-implemented method, comprising:
receiving, from a client application associated with a user account, a request to connect to a third-party user account associated with a third-party application with the user account that is a member of a server that supports near real-time communications through the client application;
determining a third-party authentication protocol associated with the third-party application;
receiving authorization to access a third-party user account using the third-party authentication protocol;
receiving a set of curated data about activities by the third-party user account at the third-party application, the set of curated data received from the third-party authentication protocol;
determining that the set of curated data passes a set of custom requirements that includes a custom numerical threshold associated with a set parameter; and
in response to the determining that the set of curated data passing the set of custom requirements, providing an access privilege to the user account in the server based on the received set of curated data.

2. The computer-implemented method of claim 1, further comprising:
causing to display the set of curated data in a profile of the user account, wherein the profile includes an engagable link to the third-party application.

3. The computer-implemented method of claim 2, further comprising:
presenting a rating, a follower or admirer count, a number of posts, a number of sales made, a number of sale posts, or a total of hours played in a game in the third-party application in the profile.

4. The computer-implemented method of claim 2, further comprising:
receiving a customized setting for a second access privilege that requires passing a custom set of requirements by a custom set of curated data from the third-party application;
receiving the custom set of curated data from the third-party application; and
in response to passing the custom set of requirements, causing to display the custom set of curated data in the profile of the user account.

5. The computer-implemented method of claim 4, further comprising:
causing to display a customization modal that provides a means for customizing what data to be extracted resulting in the custom set of curated data, wherein the customization includes a field to include a numerical quantity associated with one of the requirements.

6. The computer-implemented method of claim 4, further comprising:
attaching a bot to the server, wherein the bot provides an application programming interface (API) that receives the custom set of curated data pushed from the third-party application.

7. The computer-implemented method of claim 1, wherein the request is for obtaining the access privilege, and wherein the access privilege allows the user account to perform one or more actions in the server.

8. The computer-implemented method of claim 7, wherein the access privilege provides access to a channel that requires all members to have the access privilege.

9. The computer-implemented method of claim 1, further comprising:
providing analytics pertaining to how many user accounts in the server have the access privilege.

10. The computer-implemented method of claim 1, further comprising:
generating a sale post associated with a third-party sale post at the third-party application; and
inserting the sale post as a comment in a channel associated with the server.

11. The computer-implemented method of claim 10, wherein the sale post is generated from the set of curated data.

12. The computer-implemented method of claim 1, wherein the receiving authentication based on the third-party authentication protocol includes validating data from a public blockchain with connected wallets and signed messages.

13. A non-transitory computer-readable medium comprising instructions, the instructions, when executed by a computing system, causes the computing system to:
receive, from a client application associated with a user account, a request to connect to a third-party user account associated with a third-party application with the user account that is a member of a server that supports near real-time communications through the client application;
determine a third-party authentication protocol associated with the third-party application;
receive authorization to access a third-party user account using the third-party authentication protocol;
receive a set of curated data about activities by the third-party user account at the third-party application, the set of curated data received from the third-party authentication protocol;
determine that the set of curated data passes a set of custom requirements that includes a custom numerical threshold associated with a set parameter; and
in response to the determining that the set of curated data passing the set of custom requirements, provide an access privilege to the user account in the server based on the received set of curated data.

14. The non-transitory computer-readable medium of claim 13, wherein the instructions, when executed by the computing system, causes the computing system to:
cause to display the set of curated data in a profile of the user account, wherein the profile includes an engagable link to the third-party application.

15. The non-transitory computer-readable medium of claim 14, wherein the instructions, when executed by the computing system, causes the computing system to:
present a rating, a follower or admirer count, a number of posts, a number of sales made, a number of sale posts, or a total of hours played in a game in the third-party application in the profile.

16. The non-transitory computer-readable medium of claim 14, wherein the instructions, when executed by the computing system, causes the computing system to:
receive a customized setting for a second access privilege that requires passing a custom set of requirements by a custom set of curated data from the third-party application;
receive the custom set of curated data from the third-party application; and
in response to passing the custom set of requirements, cause to display the custom set of curated data in the profile of the user account.

17. The non-transitory computer-readable medium of claim 16, wherein the instructions, when executed by the computing system, causes the computing system to:
causing to display a customization modal that provides a means for customizing what data to be extracted resulting in the custom set of curated data, wherein the customization includes a field to include a numerical quantity associated with one of the requirements.

18. The non-transitory computer-readable medium of claim 16, wherein the instructions, when executed by the computing system, causes the computing system to:
attaching a bot to the server, wherein the bot provides an application programming interface (API) that receives the custom set of curated data pushed from the third-party application.

19. A system comprising:
one or more processors; and
a non-transitory computer-readable medium comprising instructions, the instructions, when executed by the one or more processors, causes the one or more processors to:
receive, from a client application associated with a user account, a request to connect to a third-party user account associated with a third-party application with the user account that is a member of a server that supports near real-time communications through the client application;
determine a third-party authentication protocol associated with the third-party application;
receive authorization to access a third-party user account using the third-party authentication protocol;
receive a set of curated data about activities by the third-party user account at the third-party application, the set of curated data received from the third-party authentication protocol;
determine that the set of curated data passes a set of custom requirements that includes a custom numerical threshold associated with a set parameter; and
in response to the determining that the set of curated data passing the set of custom requirements, provide an access privilege to the user account in the server based on the received set of curated data.

20. The system of claim 19, wherein the instructions, when executed by the one or more processors, causes the one or more processors to:
causing to display the set of curated data in a profile of the user account, wherein the profile includes an engagable link to the third-party application.

* * * * *